(12) United States Patent
Ligeski et al.

(10) Patent No.: US 7,693,622 B2
(45) Date of Patent: Apr. 6, 2010

(54) METHOD AND APPARATUS FOR SELECTING AND PROVIDING A SET OF INSTRUMENTATION SIGNALS FOR LOCOMOTIVE TESTING AND DIAGNOSTIC PURPOSES

(75) Inventors: Scott E. Ligeski, Naperville, IL (US); Alexander C. Crosman, Downers Grove, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 656 days.

(21) Appl. No.: 11/444,774

(22) Filed: Jun. 1, 2006

(65) Prior Publication Data
US 2007/0299569 A1 Dec. 27, 2007

Related U.S. Application Data

(60) Provisional application No. 60/686,156, filed on Jun. 1, 2005.

(51) Int. Cl.
*G06F 11/00* (2006.01)

(52) U.S. Cl. ............................................ 701/19; 710/8

(58) Field of Classification Search ................... 701/19, 701/20, 32, 34, 29; 710/8, 62, 102; 713/1, 713/2, 100
See application file for complete search history.

(56) References Cited

U.S. PATENT DOCUMENTS

| | | | | |
|---|---|---|---|---|
| 5,528,486 A | * | 6/1996 | Kumar et al. | 363/95 |
| 5,659,680 A | * | 8/1997 | Cunningham et al. | 714/25 |
| 6,580,975 B2 | * | 6/2003 | Lovelace et al. | 701/19 |
| 6,772,328 B1 | * | 8/2004 | Talbot et al. | 713/1 |
| 6,779,128 B1 | * | 8/2004 | Gale et al. | 714/6 |
| 7,311,364 B2 | * | 12/2007 | Robertson | 303/7 |

* cited by examiner

*Primary Examiner*—Dalena Tran
(74) *Attorney, Agent, or Firm*—Eugene M. Cummings, P.C.

(57) ABSTRACT

A technique for downloading data from a processor unit, such as an inverter control computer associated with a locomotive control system. When the software for the inverter control computer is originally built, a programmer assigns an ID number to all of the possible instrumentation signals that can be downloaded from the inverter control computer. From the complete list of the instrumentation signals, the programmer defines a default set of the instrumentation signals that are downloaded. If a user wishes to change the instrumentation signals that can be downloaded, then the user provides a command signal to the inverter control computer that changes the set of ID numbers of the instrumentation signals to be downloaded.

12 Claims, 4 Drawing Sheets

LAPTOP CONNECTED TO THE LCC

LAPTOP CONNECTED TO THE LCC

METHOD AND APPARATUS FOR SELECTING AND PROVIDING A SET OF INSTRUMENTATION SIGNALS FOR LOCOMOTIVE TESTING AND DIAGNOSTIC PURPOSES

RELATED APPLICATION

This application claims the benefit of U.S. Provisional Application No. 60/686,156, filed Jun. 1, 2005.

BACKGROUND OF THE INVENTION

1. Field of the Invention

This invention relates generally to a technique for recording data from a processor unit and, more particularly, to a method and apparatus for selecting and providing a set of instrumentation signals for locomotive testing and diagnostic purposes.

2. Discussion of the Related Art

A typical locomotive employs a locomotive control computer (LCC) that controls the operation of the locomotive, and an inverter control computer (ICC) that controls a power inverter to provide command signals to a set of alternating current (AC) motors driving the locomotive. In one design, the LCC and the ICC are implemented in the locomotive as separate hardware modules, where the ICC is part of a processor unit such as a multiple processor unit (MPU) module. In that case, the LCC and ICC are configured to communicate with each other via use of a serial (point-to-point) link by reading and writing data to a dual-port (shared) memory (e.g., a dual-port RAM), physically located in the ICC. Accordingly signals transmitted between the LCC and ICC are generally those needed for locomotive control functions such as torque and speed references and feedbacks, fault information and speed calibrations.

Currently, a diagnostic user interface to the LCC, such as a LCC monitor program, is implemented in the LCC to enable a user to download diagnostic signals (diagnostics) and instrumentation signals concerning LCC operation for testing purposes and the like. Unlike the LCC however, the ICC does not have a comparable monitor program function to provide a diagnostic user interface to the ICC for purposes of enabling the user to download diagnostics and instrumentation signals concerning ICC operation for testing purposes and the like. Rather, the dual-port memory, via the LCC, is currently the only option available to enable the user to communicate with the ICC for testing and diagnostic purposes.

In order to accommodate engineering testing and diagnostics of the ICC, provisions have been made in the ICC module hardware design to include an optional instrumentation daughterboard that accesses pre-selected ICC instrumentation signals provided via ICC software located in the ICC. The instrumentation daughterboard is configured to enable user access to thirty-two instrumentation signals provided by the ICC software; sixteen pre-selected hardware signals and sixteen pre-selected software instrumentation signals out of many more than sixteen possible software instrumentation signals. Because there is no direct diagnostic user interface implemented in the ICC however, the set of sixteen software ICC signals are pre-selected during the original programming of the ICC software. As a result, if a different set of sixteen software instrumentation signals is required, such as for debugging a performance problem, it is necessary to rebuild and reload the ICC software into the ICC at significant expense and time.

SUMMARY OF THE INVENTION

In accordance with the teachings of the present invention, a method is disclosed for downloading data from a processor unit that includes reconfiguring instrumentation signals by defining an interface to a dual-port shared memory. In one embodiment, the technique is used in combination with a locomotive control system that includes a locomotive control computer and an inverter control computer. When the software for the inverter control computer is originally built, a programmer assigns an ID number to all of the possible instrumentation signals that can be downloaded from the inverter control computer. From the complete list of the instrumentation signals, the programmer defines a default set of the instrumentation signals that are downloaded from the inverter control computer. If a user wishes to change the instrumentation signals that can be downloaded from the inverter control computer to a new set of signals, then the user provides a command signal to the inverter control computer that changes the set of ID numbers of the instrumentation signals to be downloaded.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a process for recording data from a remote processor is merely exemplary in nature, and is in no way intended to limit the invention or its applications or uses. For example, the process of the invention has particular application for selectively downloading diagnostic and testing instrumentation signals from an inverter control computer of a locomotive control system. However, the process of the invention may have application for other systems.

Figure 1:
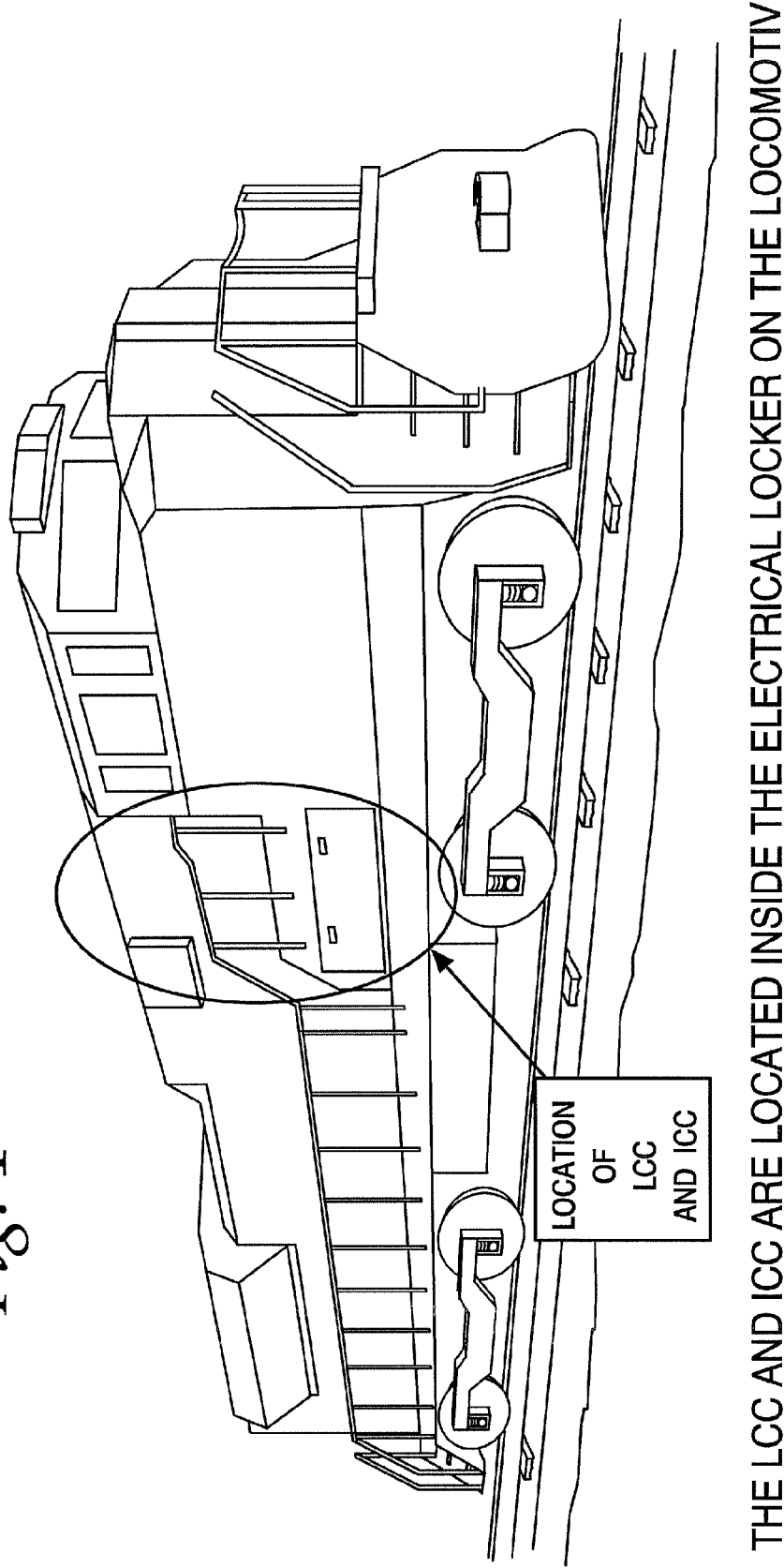
FIG. 1 is a line drawing of a locomotive, according to an embodiment of the invention.

FIG. 1 is a line drawing of a locomotive 10, according to an embodiment of the invention. Indicated in this figure is where a locomotive control computer (LCC) and an inverter control computer (ICC) would typically reside on the locomotive.

Figure 2:
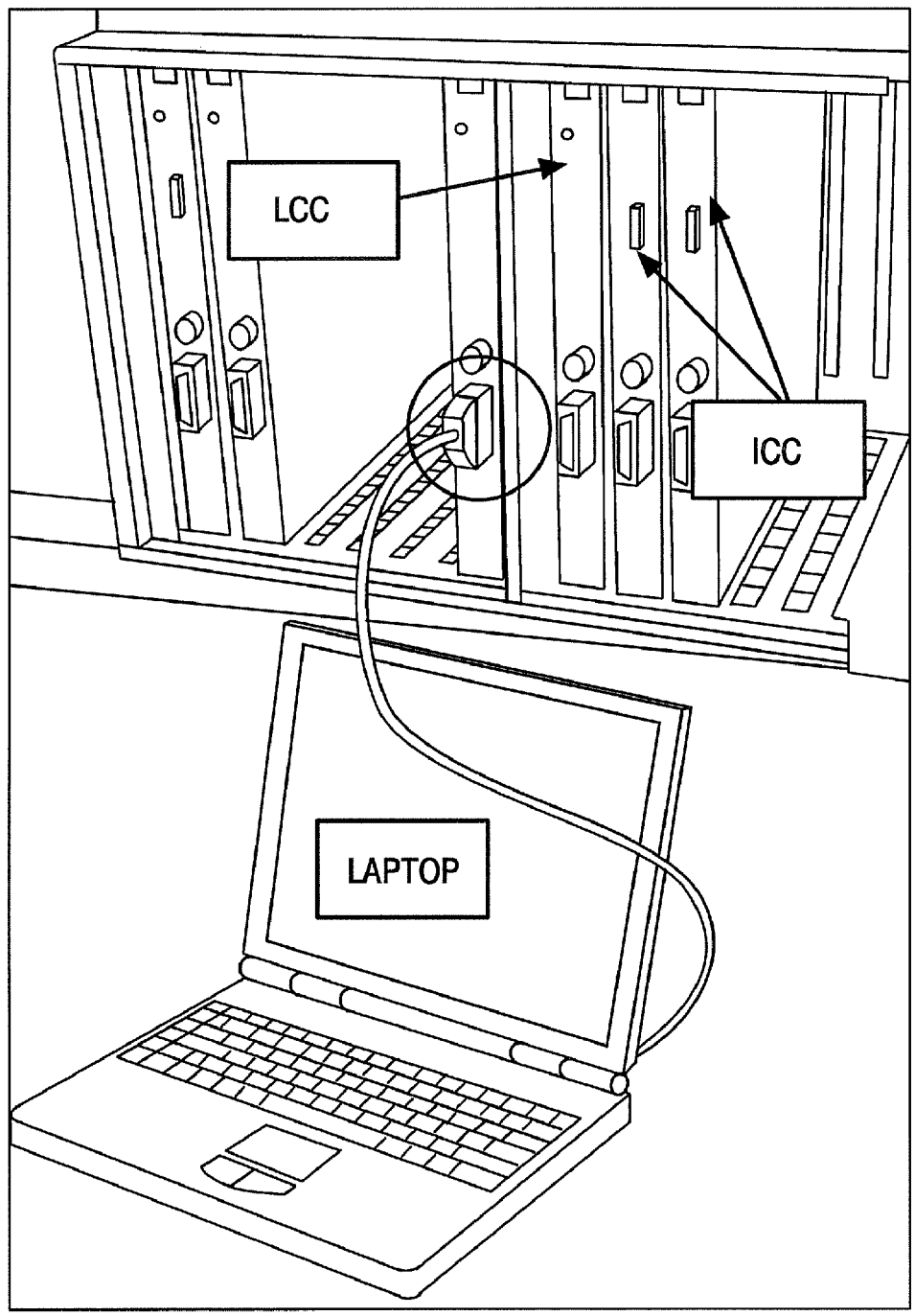
FIG. 2 is a more detailed line drawing of a portion of the locomotive of FIG. 1.

FIG. 2 is a more detailed line drawing of a portion 50 of the locomotive of FIG. 1. This portion 50 of the locomotive includes, among other things, an LCC 112 operatively coupled to an ICC 114. The LCC 112 is further operatively coupled to a laptop computer 124 in accordance with an embodiment of the present invention.

Figure 3:
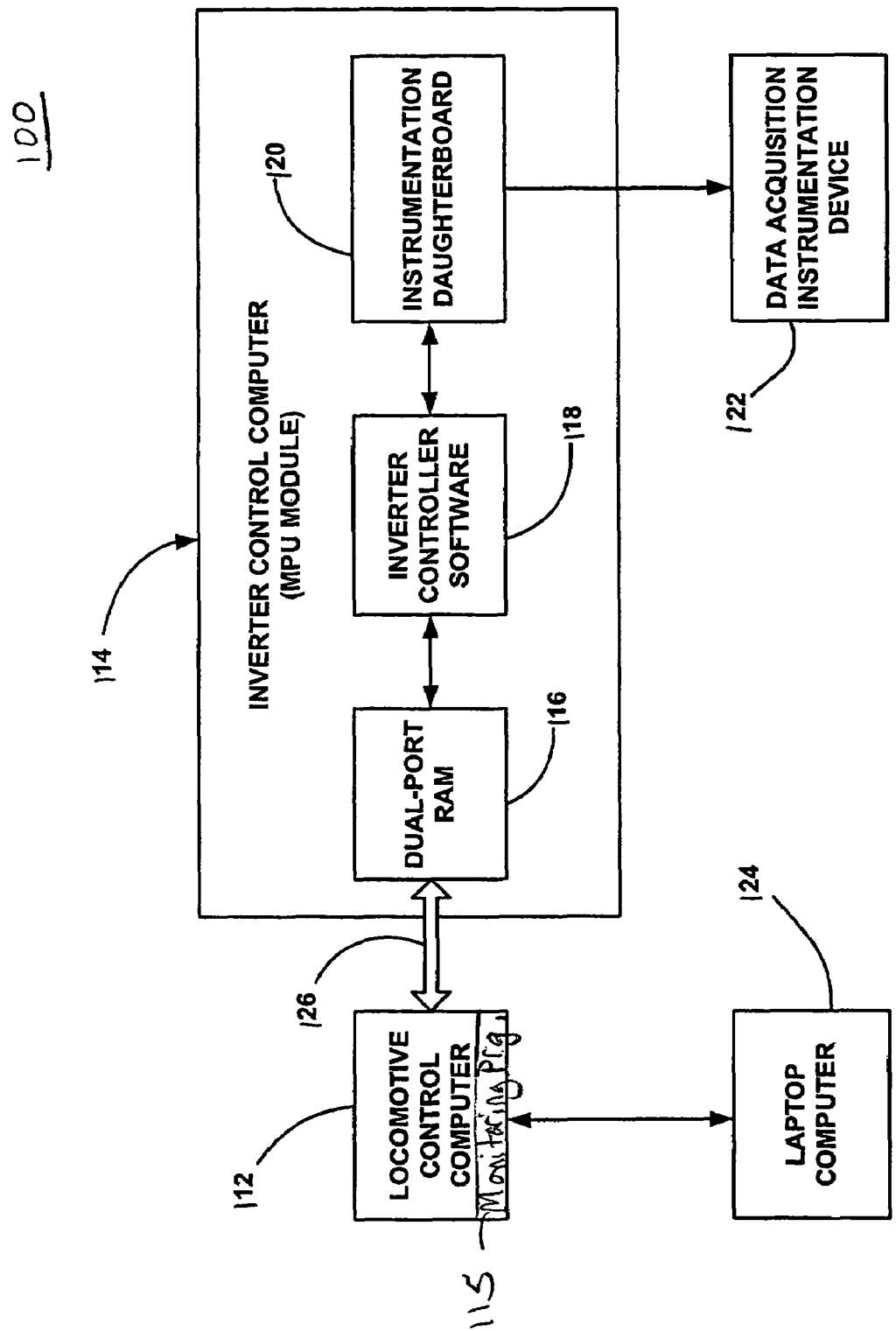
FIG. 3 is block diagram of a locomotive control system enabling preferred ICC instrumentation signals to be provided during locomotive testing and diagnostics, according to an embodiment of the invention.

FIG. 3 is block diagram is block diagram of the portion 50 of the locomotive (e.g., as shown in FIG. 1) in accordance with an embodiment of the present invention. The portion 50 of the locomotive generally includes a locomotive control system 100 enabling preferred ICC instrumentation signals to be provided during locomotive testing and diagnostics, according to an embodiment of the invention. The locomotive control system 100 includes a locomotive control computer (LCC) 112 operatively coupled to an inverter control computer (ICC) 114, both operable as described above. The ICC is an example of a multiple processor unit (MPU) as described above. An LCC monitor program 115 implemented in the LCC 112 provides a diagnostic user interface to the LCC 112. The ICC 114 includes a dual-port RAM 116 that enables signals to be written and read between the LCC 112 and the ICC 114 via a VersaModular Eurocard (VME) bus 126 or other comparable communications link. The ICC 114 also includes inverter controller software 118 adapted to operate the ICC 114, and an instrumentation daughterboard 120.

A data acquisition instrumentation device 122 is operatively coupled to the instrumentation daughterboard 120. During normal locomotive operation, the inverter controller software 118 causes ICC instrumentation signals to be provided to the instrumentation daughterboard 120. The ICC instrumentation signals are then downloaded from the instrumentation daughterboard 120 to the data acquisition instrumentation device 122 where they can be accessed by the user for testing and diagnostic purposes.

As mentioned above, the ICC 114 was traditionally programmed to provide a predefined set of sixteen hardware-based ICC instrumentation signals and a predefined set of sixteen software-based ICC instrumentation signals to the instrumentation daughterboard 120 for collection via the data acquisition instrumentation device 122. Unlike prior art methods however, the apparatus and method disclosed herein enables the user to select which sixteen of the many software-based ICC instrumentation signals are to be made available for testing and diagnostic purposes. Accordingly, costly and time-consuming reprogramming of the inverter controller software 118 is no longer necessary each time different software-based ICC instrumentation signals are desired for testing and diagnostic purposes.

In general, the method includes enabling user diagnostic interface capability to the inverter control software 118 via the LCC monitor program 115 and the dual-port RAM 116. When enabled, such user diagnostic interface capability allows the user with access to a laptop computer 124 operatively coupled to the LCC 112, to communicate with the LCC monitor program 115 to cause the locomotive monitor program 115 to send commands (discussed below) to the ICC 114 to select which set of sixteen software-based ICC instrumentation signals are to be provided to the instrumentation daughterboard 120 (and the data acquisition instrumentation device 122) for subsequent testing and diagnostic purposes.

More specifically prior to an inverter controller software 118 build, a programmer defines a list of all possible software-based ICC instrumentation signals that can be provided to the instrumentation daughterboard 120 and subsequently downloaded to the data acquisition device 122. Appropriate scale factors and offsets associated with the ICC instrumentation signals are also determined. Identification numbers are then assigned to each of the ICC instrumentation signals. The software-based ICC instrumentation signals, their associated scale factors and offsets and identification numbers are then encoded in a look-up table of the inverter controller software 118.

Using the list of all possible software-based ICC instrumentation signals, the programmer defines a default set of sixteen software-based ICC instrumentation signals. The default set of sixteen software-based ICC instrumentation signals is to be used in the event, that during locomotive testing and diagnostics, the user does not want to collect ICC instrumentation signals other than those in the defaultset of sixteen. In the case where the user desires to collect ICC instrumentation signals other than those in the default set, he/she enters a user modification command to enable customization of the default set to form a new set of sixteen software-based ICC instrumentation signals. Accordingly, the default set of ICC instrumentation signals will be provided to the instrumentation daughterboard 120 (and subsequently to the data acquisition instrumentation device 122 upon user request) unless the user enters the user modification command to prompt the LCC monitor program 115 to do otherwise. Thus, upon completion of the inverter control software 118 build, every possible software ICC instrumentation signal that can be used to assess the state of the inverter control computer 114 for locomotive testing and diagnostic purposes is identified and included in a look-up table of the inverter controller software 118, and a default set of sixteen software-based ICC instrumentation signals is pre-selected.

Upon inclusion in the inverter controller software 118 build, the default set of sixteen software-based ICC instrumentation signals can be provided to the instrumentation daughterboard 120 during testing and diagnostic activities associated with the inverter control computer 114. Alternatively, the default set of sixteen software-based ICC instrumentation signals can be modified to replace from one to sixteen of the default set of sixteen software-based ICC instrumentation signals to form a new set of software-based ICC instrumentation signals.

In general, the new set of sixteen software-based ICC instrumentation signals is established when the user, using the laptop computer 124 in communication with the LCC monitor program 115 (see, FIG. 2), first enters the user modification command to modify the default set, and then enters the ID numbers of the one to sixteen replacement software-based ICC instrumentation signals. The LCC monitor program 115 then causes the user modification command and the identification number(s) (ID number(s)) of the new, or replacement, software-based ICC instrumentation signals to be populated on the dual-port RAM 116 as a new set of software-based ICC instrumentation signals. As a result, during subsequent ICC 114 testing and diagnostics, the inverter controller software 118 causes the new set of software-based ICC instrumentation signals to be written to the instrumentation daughterboard 120. Thus, using the laptop computer 124, the user can choose which sixteen software-based ICC instrumentation signals are to be provided to the daughterboard 120 during normal locomotive operation (and subsequently downloaded to the data acquisition instrumentation device 122) for ICC 114 testing and diagnostics, thereby precluding the need for a programmer to execute a time-consuming inverter control software 118 build.

Figure 4:
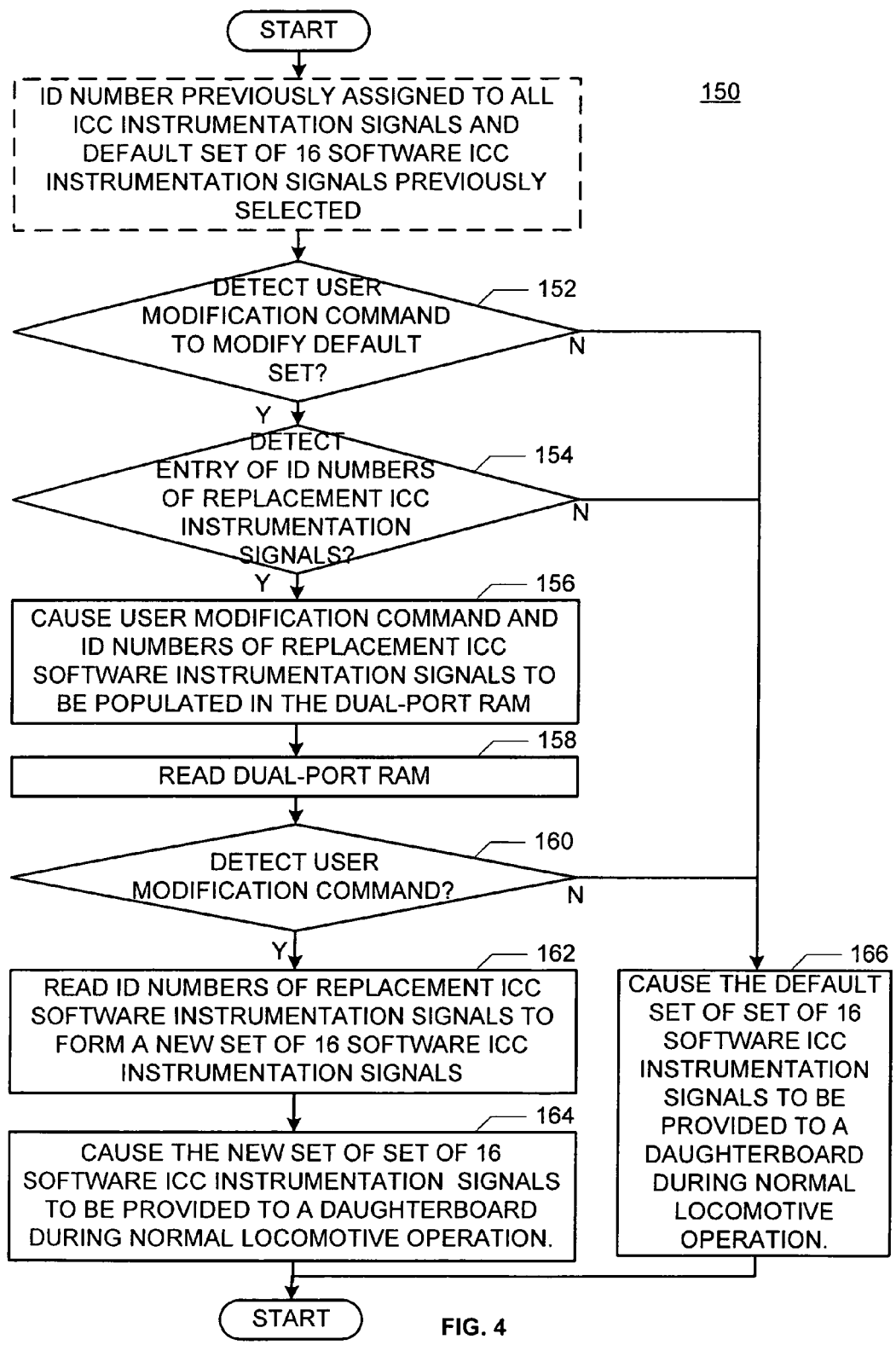
FIG. 4 is an exemplary flow chart of a method for providing a set of preferred ICC instrumentation signals during locomotive testing and diagnostics, according to an embodiment of the present invention.

FIG. 4 is an exemplary flow chart of a method 150 for providing a set of chosen ICC instrumentation signals during locomotive testing and diagnostics, according to an embodiment of the present invention. Referring to FIG. 4, the method 150 begins when the LCC 114, via the LCC monitor program 115, detects user entry of the user modification command to modify the default set of sixteen software-based ICC instrumentation signals (decision step 152), previously defined in the inverter controller software 118 as described in connection with FIG. 3, and detects user entry of ID numbers of replacement software-based ICC instrumentation signals (decision step 154). The ID numbers as well as appropriate scale factors and offsets associated with the software-based ICC instrumentation signals were previously encoded in a software look-up table during a build of the inverter controller software 118 as described in connection with FIG. 3. The user accesses the LCC monitor program 115 using the laptop computer 124.

Next, in response to detecting the user modification command and the ID numbers of replacement software-based ICC instrumentation signals, the LCC 112 causes the user modification command and the ID numbers of replacement software-based ICC instrumentation signals to be populated on the dual-port RAM 116 (step 156), thereby making a new set of sixteen software-based ICC instrumentation signals available during subsequent ICC testing and diagnostics.

Upon initiation of testing and diagnostics during normal locomotive operation, the ICC 114, via the inverter control software 118, reads the dual-port ram 116 (step 158). If the user modification command is detected (decision step 160), the ICC 114 reads the ID numbers of the replacement software-based ICC instrumentation signals to form a new set of sixteen software-based ICC instrumentation signals (step 162). The ICC 114 then searches and queues the new set of sixteen software-based ICC instrumentation signals (and associated scale factors and offsets) using their corresponding ID numbers, thereby causing the new set of sixteen software-based ICC instrumentation signals to be provided to the instrumentation daughterboard 120 during normal locomotive operation (step 164). In an embodiment, the new set of sixteen software-based ICC instrumentation signals (available through the instrumentation daughterboard 20) becomes the new default set of sixteen software-based ICC instrumentation signals.

Referring again to decision step 160, if the user modification command is not detected (decision step 160), the ICC 114 searches and queues the default set of sixteen software-based ICC instrumentation signals (and associated scale factors and offsets) using their corresponding ID numbers, thereby causing the default set of sixteen software-based ICC instrumentation signals to be provided to the instrumentation daughterboard 120 during normal locomotive operation (step 166). The ICC 114 periodically reads the dual-port RAM 116 to check for further updates to the set of sixteen software-based ICC instrumentation signals The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for downloading instrumentation signals from a locomotive control system, said method comprising:
   providing a locomotive control computer, said locomotive control computer running a locomotive monitor program;
   providing an inverter control computer in communication with the locomotive control computer through a VME bus;
   identifying a list of all possible instrumentation signals that can be downloaded from the inverter control computer;
   assigning an ID number to each instrumentation signal;
   identifying a default set of the instrumentation signals to be downloaded from the inverter control computer;
   identifying a new set of the instrumentation signals that are to be downloaded from the inverter control computer by selectively sending a new set of ID numbers to the inverter control computer through the monitor program that identifies the new set of instrumentation signals; and
   downloading the instrumentation signals from the inverter control computer.

2. The method according to claim 1 wherein providing an inverter control computer includes providing an inverter control computer including a dual-port RAM, wherein signals transmitted on the VME bus are transmitted through the RAM.

3. The method according to claim 1 wherein the default set and the new set of instrumentation signals include sixteen instrumentation signals.

4. The method according to claim 1 wherein providing an inverter control computer includes providing an instrumentation daughterboard in the inverter control computer, wherein downloading the instrumentation signals from the inverter control computer includes downloading the signals through the instrumentation daughterboard.

5. A locomotive control system for controlling a locomotive, said control system comprising:
   a locomotive control computer running a locomotive monitor program; and
   an inverter control computer in communication with the locomotive control computer through a bus, said inverter control computer including a dual-port RAM and an instrumentation daughterboard, wherein the inverter control computer includes a list of possible instrumentation signals to be downloaded form the inverter control computer where each instrumentation signal is assigned an ID number, wherein a set of the instrumentation signals can be downloaded from the inverter control computer, and wherein the set of instrumentation signals to be downloaded from the inverter control computer can be changed by selectively modifying the list of ID numbers through the monitor program.

6. The system according to claim 5 wherein the number of instrumentation signals to be downloaded from the inverter control computer is sixteen signals.

7. A system for providing a diagnostic user interface between a locomotive control computer and an inverter control computer, said system comprising:
   a locomotive control computer including a diagnostic user interface for acquiring diagnostic information associated therewith;
   an inverter control computer for monitoring and controlling the AC motors of the locomotive, said inverter control computer including a set of instrumentation signals for providing diagnostic information associated therewith, wherein each of the instrumentation signals includes a unique identifier;
   a serial port coupled to the locomotive and inverter control computers for allowing communication between the computers; and
   a memory location accessible to the locomotive control computer and operatively coupled to the inverter control computer for storing the instrumentation signals of the inverter control computer, wherein the diagnostic user interface of the locomotive control computer is adapted to allow a user to select a set of instrumentation signals to be stored by the memory location and accessible to the locomotive control computer for acquisition by selecting the unique identifiers associated therewith.

8. The system of claim 7 wherein the instrumentation signals are associated with inverter control computer hardware.

9. The system of claim 7 wherein the instrumentation signals are associated with inverter control computer software.

10. The system of claim 7 wherein the diagnostic user interface includes a locomotive control computer monitor program.

11. The system of claim 7 further including a user input device coupled to the diagnostic user interface to allow a user to select the instrumentation signals to be stored by the memory location and accessible to the locomotive control computer for acquisition.

12. The system of claim 11 wherein the user input device is a laptop computer.

* * * * *